(No Model.)
G. H. CORMACK.
PROCESS OF PREPARING GRAIN PRODUCTS.
No. 353,924. Patented Dec. 7, 1886.
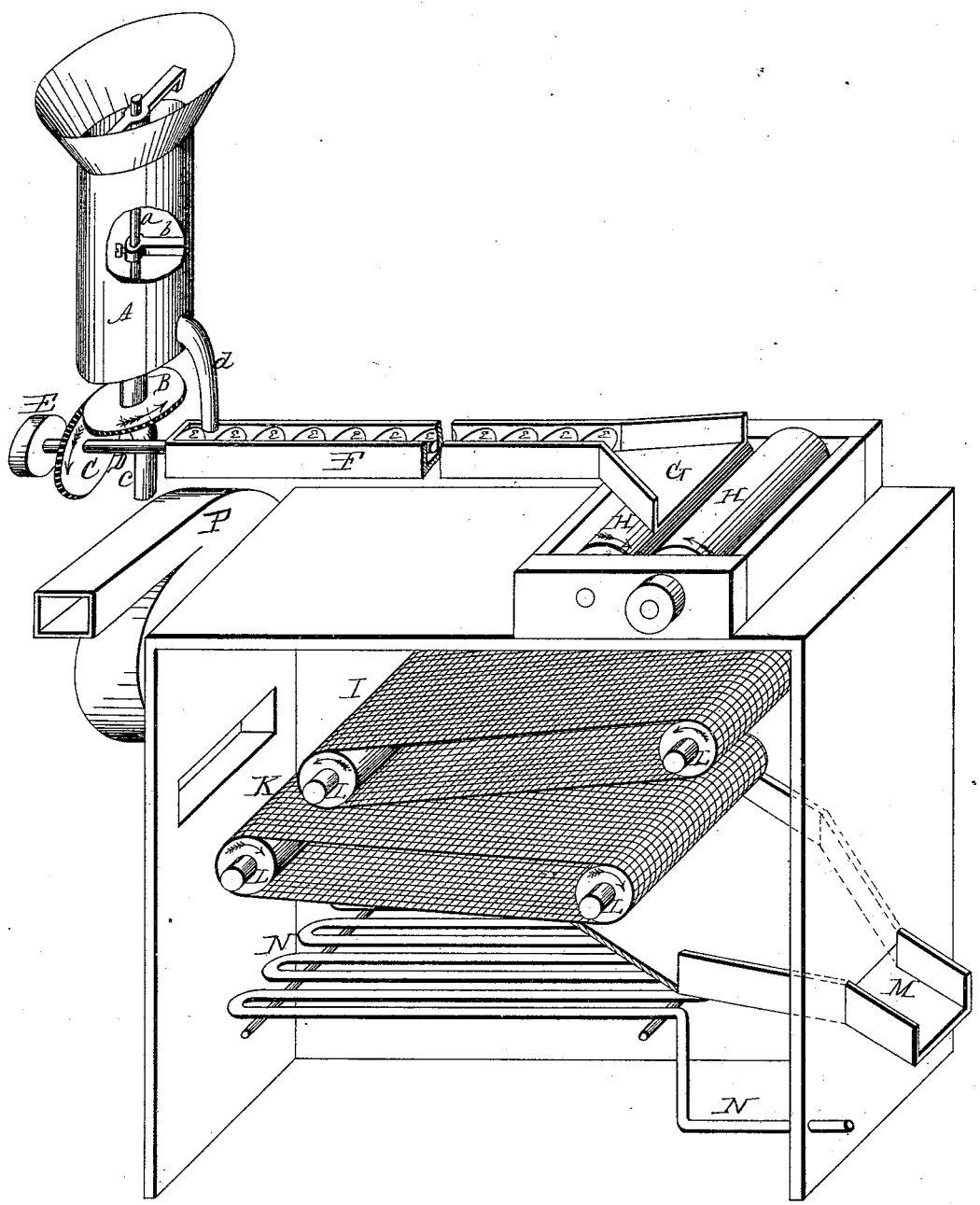
Witnesses,
A. O. Behel
Evans Blake
Inventor.
George H. Cormack
Per Jacob Behel
Atty.

UNITED STATES PATENT OFFICE.

GEORGE H. CORMACK, OF ROCKFORD, ILLINOIS.

PROCESS OF PREPARING GRAIN PRODUCTS.

SPECIFICATION forming part of Letters Patent No. 353,924, dated December 7, 1886.

Application filed December 5, 1885. Serial No. 184,854. (No specimens.)

*To all whom it may concern:*

Be it known that I, GEORGE H. CORMACK, a citizen of the United States, residing in the city of Rockford, in the county of Winnebago and State of Illinois, have invented a new and useful Process of Preparing Grain Products; and I do hereby declare that the following is a full, clear, and exact description of my invention, which will enable others skilled in the art to which it appertains to use my improvements.

Heretofore it has been customary in the preparation of the eatable grains as an article of food to reduce them to flour, meal, grits, or flakes by grinding, cutting, or crushing when in a dry state; and in the varieties such as oats and barley, in which the several grains are incased in a hull or husk, it has been, and still is, the custom to subject them to a hulling process to prepare them for the reducing process. In some instances these incased cereals have first been subjected to a steaming process to loosen the hull from the grain and then subjected to a drying process to prepare them for the operation of removing the hulls from the grains to fit them for the reducing process; but in every instance, so far as known to me, the reduction of the different kinds of cereals when designed as an article of human food for present or future use have been prepared from the grain in a dry state.

In my experience in the manufacture of flakes from dried grains it is found that a considerable portion of the grain in the process of crushing is reduced to a powder or flour, which, if permitted to remain with the flakes, greatly lessens their market value, and if separated therefrom greatly lessens the quantity of flakes produced from a given quantity of grain.

To obviate these difficulties and to produce the greatest quantity and best quality of flakes from a given quantity of grain in a condition fitted to withstand climatic changes and the action of different climates is the object of my invention.

To this end I have invented the process hereinafter fully described, and pointed out in the claims.

An apparatus capable of carrying out my process is represented in the single figure constituting the accompanying drawing in this case, and in which a cylindrical steamer, A, is provided with a tubular shaft, $a$, supported to revolve in its axial center, and its upper end portion is provided with a series of perforations. This tubular shaft is provided at intervals with stirrers $b$, to revolve with the shaft within the cylinder, and a pipe, $c$, connects the tubular shaft with a steam-supply. The steamer is provided with an outlet-spout, $d$, through which the steamed grain is discharged by the action of the stirrers. The tubular shaft is provided with a gear-wheel, B, to engage a gear-wheel, C, mounted on a conveyer-shaft, D, on which is mounted a pulley, E, to connect the apparatus with the movement by means of a belt. This steaming apparatus, although not shown in this instance in all its details of construction, is in every essential particular substantially identical with the steaming apparatus secured to me in Patent No. 268,782.

The conveyer-shaft D is provided with conveyer-blades $e$ in spiral or screw form, and is supported to revolve in a conveyer-box, E, having a flaring discharge end, G. Like crushing-rollers, H, are supported in suitable bearings to revolve toward each other on their upper surfaces immediately under the discharge end G of the conveyers. Endless aprons I and K, of screen or bolting cloth, are supported within a chamber on each roll L, supported to revolve in the direction indicated by the arrows thereon. A discharge-spout, M, is supported under the delivery end of the aprons, and its delivery end extends through the walls of the chamber. A steam-coil, N, is placed within the chamber containing the screens and is suitably connected with a steam-supply. An exhaust-fan, P, is connected with the end of the chamber opposite the discharge-spout M. The open side of the chamber containing the screen is then closed.

The several parts of the apparatus are suitably connected by belts or otherwise with a prime mover to cause them to rotate as indicated by the arrows. Steam is introduced into the tubular shaft in the steamer and into the steam-coil in the drying-chamber. The grain is passed into the steamer at its upper flaring end, and is subjected to the action of the steam escaping through the perforations in the upper end portion of the tubular shaft, and by the action of the stirrers is passed through the outlet-spout into the conveyer and delivered from its discharge end to the rollers, and in its passage through the rollers is crushed into flakes and delivered to the screens and carried by the movement thereof through the heated and ventilated chamber and delivered through the discharge-spout dried and free from dust.

The foregoing is one form of a practical apparatus for the purpose.

In the foregoing I have outlined one form of apparatus capable of use in carrying out my improved process in the manufacture of flakes, but do not wish to confine myself to the described apparatus, as other forms may be employed.

In the foregoing I have confined the description of my improved process to the manufacture of flakes; but it is capable of use in the manufacture of grits, in which instance the grains are preferably cut in sections crosswise, but in every other particular is substantially the same as in the manufacture of flakes.

By my improved process I am enabled to produce an increased quantity and a superior quality of flakes or grits from a given quantity of grain than by any other process heretofore in use known to me.

I claim as my invention—

1. In the preparation of grain products, the process substantially as herein described, consisting in steaming the grain, partially drying the steamed grain, reducing the partially-dried grains, and subjecting the product to a drying process, as and for the purpose set forth.

2. The herein-described process in the preparation of grain products, consisting in steaming the grain, partially drying and cooling the steamed grain, crushing the partially dried and cooled grains, and subjecting the crushed grains to a drying and separating process, substantially as and for the purpose set forth.

GEORGE H. CORMACK.

Witnesses:
W. S. BRONSON,
A. O. BEHEL.